United States Patent [19]

Vogel

[11] Patent Number: 4,540,317
[45] Date of Patent: Sep. 10, 1985

[54] SELF-CLEANING SLIDABLE COVER AND TRACK ASSEMBLY FOR PNEUMATIC CARRIER TERMINAL

[75] Inventor: Victor J. Vogel, Oak Ridge, N.J.

[73] Assignee: American Standard Inc., New York, N.Y.

[21] Appl. No.: 611,332

[22] Filed: May 17, 1984

[51] Int. Cl.³ .............................................. B65G 51/26
[52] U.S. Cl. ....................................... 406/112; 49/477
[58] Field of Search ................................ 406/110–112, 406/147–150; 49/477

[56] References Cited

U.S. PATENT DOCUMENTS

| | | |
|---|---|---|
| 1,092,982 | 4/1914 | D'Humy . |
| 2,698,721 | 1/1955 | Van Otteren ........................ 406/112 |
| 4,059,246 | 11/1977 | Anders et al. . |
| 4,135,684 | 1/1979 | Willey . |
| 4,189,260 | 2/1980 | Morano et al. ................. 406/112 X |
| 4,325,660 | 4/1982 | Jones . |
| 4,436,456 | 3/1984 | Thomas .......................... 406/112 X |

Primary Examiner—Jeffrey V. Nase
Attorney, Agent, or Firm—Wood, Herron & Evans

[57] ABSTRACT

A self-cleaning track and slidable cover for a station of a pneumatic carrier system, such as for the customer terminal of a drive-up banking system, is disclosed. The terminal cover slides along a track on the station to provide selective access to the terminal interior for insertion and removal of carriers. A temporary airflow path is defined between the bottom edge of the cover and the track through which passes pressurized air supplied to the terminal interior when the cover is closed and carrier transmission from the terminal is desired. The pressurized air passing through this path blows dirt and debris from the track which might otherwise build up and bind the sliding cover. As the air pressure in the terminal interior increases, a valve member in the form of a flexible flap extending along the airflow path moves into a position blocking the airflow path, allowing completion of pressurization of the terminal for transmission of a carrier.

6 Claims, 3 Drawing Figures

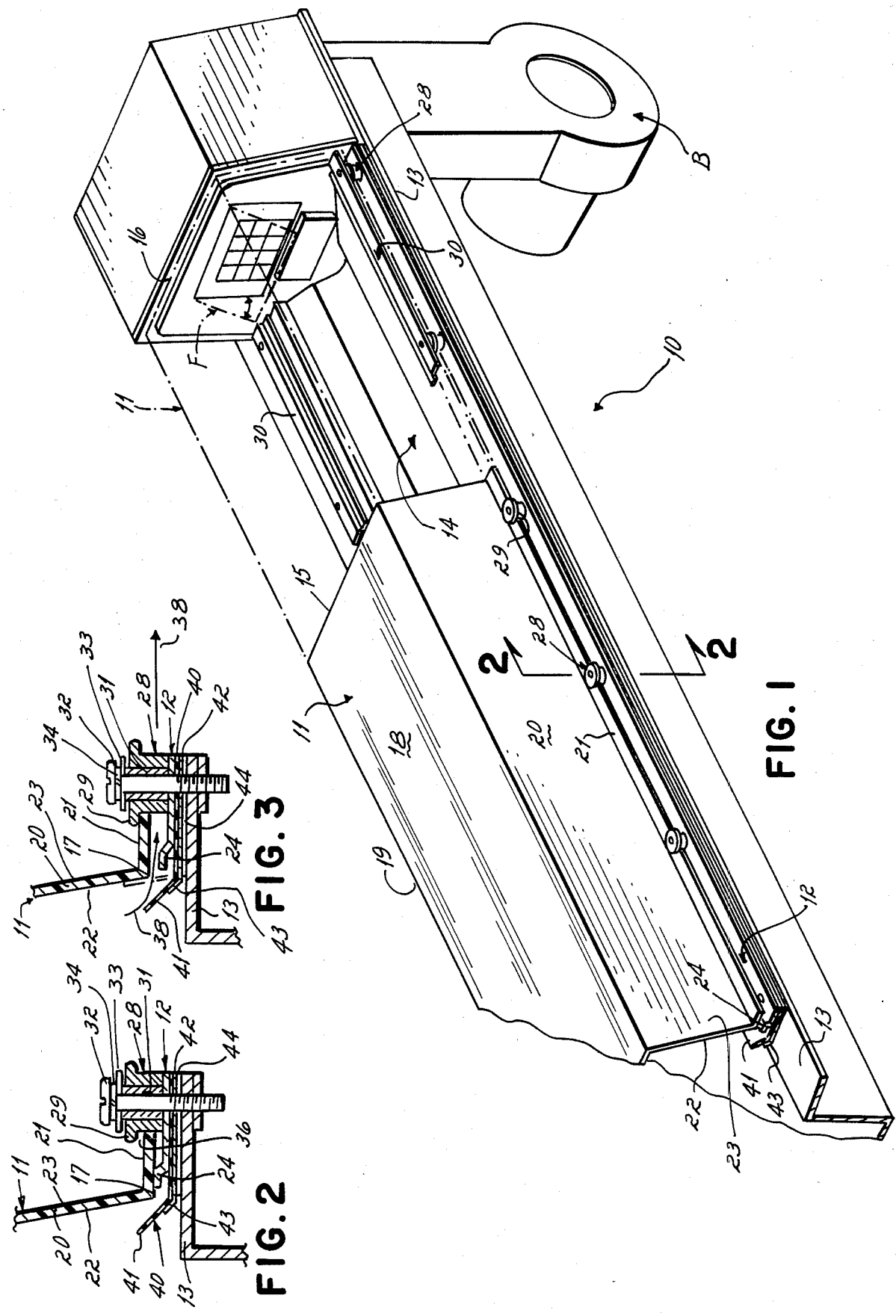

SELF-CLEANING SLIDABLE COVER AND TRACK ASSEMBLY FOR PNEUMATIC CARRIER TERMINAL

FIELD OF THE INVENTION

This invention generally relates to pneumatic carrier systems for drive-up banking and the like, and more particularly to a terminal or station for such a pneumatic carrier system having a cover which slides to open and close the terminal to facilitate insertion/removal of a carrier.

BACKGROUND OF THE INVENTION

Pneumatic tube apparatus and systems have long been known, and have been particularly adapted to drive-up banking. In such banking systems a number of exterior customer stations are located in a vehicle drive-through area. Each customer station has a terminal connected by a pneumatic tube or conduit to a teller terminal located at a remote point, such as a bank building. A carrier is pneumatically transported between teller and customer terminals through conduits to effect banking transactions. The carrier is typically drawn and/or pushed through the conduits by air pressure differentials across the carrier created in the conduit, the pressure differentials being typically supplied by a blower creating positive or negative air pressure within the conduit to effect carrier movement.

Many of the pneumatic carrier systems of this type provide for the horizontal delivery of the carrier, at least at the customer station. A sliding, axially traversed (i.e., horizontally moving), cover has been employed to open and close the terminal at the customer station to permit access thereto for insertion and removal of the carrier from the terminal. With the carrier in the terminal and the cover closed, the terminal is pressurized to effect movement of the carrier to another station.

Sliding covers of the foregoing type typically slide on tracks. Dust and debris falling on the tracks and sliding off the cover onto the tracks can build up on the track surface to the point where binding of the cover takes place. This has been recognized to be a problem particularly in customer terminals located in dusty areas, such as in the U.S. Southwest. The problem has been specifically noted with terminal covers having an outwardly extending flange located along the bottom of the cover which slides in a "C" or "U" shape track element. Binding of the cover by dust and the like building up in this type of relatively enclosed track can present an acute problem.

SUMMARY OF THE INVENTION

It is a primary object of this invention to provide a pneumatic carrier terminal of the type having a horizontally sliding carrier which overcomes in a simple and expedient fashion binding between the sliding cover and track. To this end, the present invention is directed to a pneumatic carrier terminal having an improved cover and track assembly which provides for self-cleaning of the track upon which the cover slides.

A temporary airflow path between the cover and the track is established when the interior of the pneumatic terminal is initially positively pressurized (i.e., air is admitted to the terminal by a blower to push the carrier through a conduit to another terminal). This airflow path is preferably established along substantially the entire length of the track on which the cover slides.

Upon initial positive pressurization of the terminal interior, a temporary blast of air is directed outwardly over the track to thereby blow dust, dirt and other debris off the track surface.

This initial blast of pressurized air is terminated through the use of a valve member located interior of the cover and extending along the length of the airflow path. The valve member, which in a preferred form is a flexible flap located along the inside of the track in the region of the interface of the track and cover, is movable from a first position where the airflow path is open, permitting pressurized air to blow dust and the like from the track, to a second position wherein the airflow path is blocked, permitting full terminal pressurization to take place for carrier transmission.

In the preferred form of the invention, a horizontally sliding door or cover is provided which is generally semi-cylindrical in shape. The sliding cover is oriented with its two parallel bottom edges disposed lowermost. Each bottom edge has an outwardly extending, horizontal flange portion terminating in a flange edge. The bottom horizontal flanges of the cover slide along surfaces of a pair of spaced, parallel, horizontal tracks, to permit the cover to open and close. Each track is in the form of a flat horizontal metal strip. Rollers spaced outboard along each track are mounted for rotation about vertical axes, and engage the outer edges of the cover flanges to thereby guide the cover bottom flanges for movement on top of, and parallel to, the underlying tracks.

The rollers have a radially extending lip or bead at the upper end thereof which overlies their respective cover flange, with the lip vertically spaced from the cover flange when the terminal is not pressurized. This spacing leaves a small gap between the bottom of the roller lips and the top of the cover flanges. When the terminal is positively pressurized to initiate carrier transmission, the cover is lifted upwardly by the pressurized air buildup within the terminal causing the cover flanges to abut against the bottom of the roller lips. This condition creates a gap between the bottom of the cover flange and the track, establishing an exhaust air path from the terminal interior through which pressurized air can flow outwardly to blow dirt and the like from the track surface and between the spaced rollers, providing a self-cleaning action.

A flexible flap in the form of a thin rubber strip is employed to act as a valve to cut off the pressurized airflow between the cover and track. The flap is advantageously fixed adjacent the track and extends along the track for the length of the airflow path. The pressurized air within the terminal causes the flexible flap to move from a first position, wherein the flap does not block the airflow between the cover bottom edges and tracks, to a second position wherein the flap blocks the airflow path by abutment against the interior of the cover, thereby forming a seal over the airflow path.

A simple and efficient cover mechanism for a pneumatic system terminal is thus provided which effectively obviates the cover binding problem due to dirt build-up between the cover and track. The improved self-cleaning cover and track of this invention can be retrofit to compatible existing sliding cover pneumatic stations of the type described.

The foregoing objectives, features and advantages of the present invention will be more readily understood upon consideration of the following detailed description of the invention taken in conjunction with the accompanying drawings, in which:

BRIEF DESCRIPTION OF THE DRAWINGS

FIG. 1 is a perspective view of a sliding cover for a pneumatic system terminal incorporating one form of the invention herein;

FIG. 2 is a cross-section of a portion of the terminal taken along line 2—2 of FIG. 1; and FIG. 3 is a view similar to FIG. 2, showing the airflow path.

DETAILED DESCRIPTION OF AN EMBODIMENT OF THE INVENTION

As shown in FIG. 1, the self-cleaning cover and track assembly of the present invention, in conjunction with a standard pneumatic carrier system terminal, is generally indicated at 10. Terminal 10, which may be at a customer station for a drive-up banking system, includes a pneumatic tube or conduit (not shown) extending from the lefthand end thereof which interconnects the customer terminal with a remote bank teller terminal for pneumatic transport of a carrier (also not shown) through the tube in either direction between the two terminals. The carrier is transported between terminals with the aid of a blower B which positively pressurizes the terminal behind the carrier to blow the carrier from one station to another. A flap or valve member F, which is pivoted along its upper edge, strikes the end of the carrier adjacent the flap upon actuation of the blower B to thereby drive the carrier into the open conduit mouth, whereupon the pressure build-up in the terminal 10 blows the carrier on its way. A pneumatic carrier system similar to that described is disclosed in U.S. Pat. No. 4,189,260, "Dispatch and Receive Terminal for a Pneumatic Carrier System," which is incorporated herein by reference. As will be made more evident in the description that follows, the instant invention performs its track cleaning function when the terminal is positively pressurized.

The terminal 10 has a semi-cylindrically shaped door or cover 11 which horizontally slides, that is, traverses axially, over tracks 12 mounted to a horizontal ledge portion 13 of the station 10. The cover 11 slides between an open position wherein access can be made to the carrier receiving area 14 of the terminal, such as for removing and replacing a carrier, and a closed position (phantom lines) with a leading edge 15 of the cover 11 abutting a receiving seat 16. It will be understood that suitable connections, seals, etc., are provided between the cover 11 and the pneumatic tube to ensure proper pressurization of the conduit will be effected and maintained for movement of the carrier therein, such being well within the skill of one knowledgeable in this art.

The cover 11, which is roughly semi-cylindrical, as noted, includes a top 18 from which depend sides 19 and 20. Sides 19 and 20 each terminate in a bottom edge 17 having an outwardly extending flange portion 21. As noted, the cover 11 slides between open and closed positions along the tracks 12. Cover 11 thus defines an inside 22 and an outside 23. In, out, inwardly and outwardly and the like will thus be understood according to this convention. Details of the cover actuating mechanism are omitted herein, such not forming any part of this invention and being well within the skill of one acquainted with this art.

Tracks 12 are made simple in form in this embodiment, each constituting a thin, flat horizontal metal strip having an upwardly bent rail-like section 24 upon which the bottom of flange portions 21 rest and over which the cover 11 slides.

The cover 11 is laterally located on the tracks 12 by means of rollers 28 which are mounted to rotate about vertical axes. The rollers 28 are spaced along the tracks and engage the outside edges of the flanges 21. The rollers 28 are each provided with an upper bead or lip 29 which overlies the top of the flange 21 to inhibit complete removal of the cover from the track. The cover 11 is preferably plastic, and as such is fairly flexible and can be easily popped into place under the roller lips 29. To prevent unauthorized removal of the cover, upper track guide portions 30 are provided which are mounted to extend over the flanges 21 a considerable distance further inboard than the lips 29 of the rollers 28.

Each of the rollers 28 has a bushing 31 through which extends a fastener, such as a pan-head screw 32, fixing the bushing 31 to the track 12 and ultimately to the ledge 13 of the station. A washer 33 and a lock washer 34 complete the roller mount. The tracks 12 are fixed to the ledge 13 of the station by the screws 32.

To prevent the collection of dirt and the like on the top of the tracks 12, the present invention provides for the establishment of an air pathway between the bottom edges of the cover 11 and the tracks 12 through which air under pressure can pass, thereby blowing debris off the track surfaces.

With specific reference to FIG. 2, lip 29 of the roller 28 is vertically spaced above the top of the flange 21, leaving a small gap 36 when the flange 21 is resting on the rail portion 24 of the track 12. The cover 11 assumes this position when the terminal is unpressurized, or negatively pressurized (i.e., air is exhausted from the terminal).

Upon initial positive pressurization of the terminal by blower B with the cover closed, the cover 11 rises due to the internal air build-up within the station until the flanges 21 abut the lower portions of the roller lips 29. When this occurs, an air gap or air path is established between the track 12 and the bottom edge 17 of the cover, extending along the length of the cover 11 through which pressurized air can pass outwardly, as indicated by the solid arrows 38 in FIG. 3. Thus, an initial flow of pressurized air passes through this air pathway 38 and between the spaced rollers 28 blowing dust and the like off the track surface.

Having cleaned the tracks 12 of debris, a valve member in the form of a flexible flap 40 is provided to block the air path 38 and seal the cover 11 and track 12. In the illustrated embodiment, the flexible flap 40 is an elongated, horizontally extending, thin rubber strip, a portion of which is secured below the track 12, as by the screws 32.

Flexible flap 40 extends along the length of the air gap 38 between the cover and track. Part of the flexible flap 40 extends within the terminal interior, forming a moving and sealing flap portion 41. The flap portion 41 is oriented, by means of flap orienting member 42, at an angle relative to the outward airflow from the terminal. The orienting member 42 is a thin stainless steel strip extending along the length of the flexible flap 40 having an upwardly bent interior edge 43 which serves to angle the flap portion 41 upwardly relative to the cover and into the path of outrushing air. Orienting member 42 is initially secured to the station ledge portion 13 by double sided adhesive tape 44 for assembly, and then fixed in place by the screws 32.

An angulation of about 45° for the bent portion 43 of the orienting member 42 has been found to provide an appropriate angulation of the flap portion 41. The upward angle of the flap portion 41 is desirable to ensure that air rushing into the airflow path 38 moves the flap portion 41 into its airflow blocking position. Here, the air path 38 is blocked by the sealing action of flap portion 41 against the inside of the cover 11, as shown in broken-line in FIG. 3.

In operation, initial positive pressurization of the terminal 10 lifts the cover 11 and causes pressurized air to flow outwardly through the air path 38 established between the cover 11 and track 12. Flexible flap portion 41 is thereupon moved by the same outrushing airflow from a first position wherein air can pass through the air path 38 thereby blowing debris and dust outwardly from the track surface, to a second position abutting the interior of the cover, thereby sealing off the air path 38. Full pressurization of the terminal for transport of the carrier can then occur. It will be noted that the bottom edges 17 and the tracks 12 self-seal upon negative pressurization of the terminal, i.e., with blower B exhausting air from the terminal 10 to suck the carrier into the terminal 10 from another station.

Thus, while the invention has been described in connection with a certain presently preferred embodiment, those skilled in the art will recognize modifications of structure, arrangement, portions, elements, materials, and components which can be used in the practice of the invention without departing from the principles of this invention. For example, although the air path 38 described herein is formed through the vertical movement of the cover 11 relative to the tracks 12, the air path could take the form of gaps or spaces along the bottom edge 17 of the cover, or gaps or spaces in the upper surface of the track, as by use of a scalloped track surface.

What is claimed is:

1. In a pneumatic carrier system for drive-up banking and the like, the system including a conduit interconnecting teller and customer terminals for pneumatically transporting a carrier through the conduit in either direction between the terminals, and blower means for moving the carrier, the improvement in a self-cleaning cover and track assembly comprising:
    a terminal cover having an interior and an exterior, the cover being axially traversed along a track on the terminal to open and close a terminal;
    means for providing an airflow path for the outflow of air from the terminal between said cover and said track when the terminal is pressurized by air from the blower means; and
    valve means extending along said airflow path and interior to said cover for sealing said airflow path, said valve means movable by the outflowing pressurized air from a first position wherein said airflow path is open permitting the outflowing pressurized air to blow debris from said track, to a second position wherein said airflow path is blocked, permitting pressurization of the terminal for pneumatic transport of the carrier from the terminal.

2. The self-cleaning cover and track assembly of claim 1, wherein said cover has a bottom with an outwardly extending flange portion terminating in a flange edge, the bottom sliding along said track in traverse of the cover, and wherein said means for providing an airflow path comprises rollers spaced along the track engaging said flange edge to position said cover bottom on the track, said rollers having a radially outwardly extending lip overlying said cover flange with said lip spaced from said cover flange when said terminal is not pressurized, such that, upon positive pressurization of the terminal by the blower means with the cover closed, the cover is lifted by the buildup of pressurized air in said terminal, said flange thereby engaging said roller lip, leaving a gap between the cover bottom and the track providing an airflow path for the outflow of pressurized air.

3. The self-cleaning cover and track assembly of claim 1, wherein said valve means is a flexible flap mounted adjacent said airflow path, said flap in said first position having a first portion extending interior to the cover and freely movable by the outflow of pressurized air to said second position wherein said flap portion blocks said airflow path.

4. The self-cleaning cover track of claim 3, wherein said flap has another portion which is fixed to the station, said first flap portion extending along the track and movable by the outflow of pressurized air to said second position and abutting the interior of the cover to thereby block said airflow path.

5. A self-cleaning cover and track assembly for a pneumatic carrier system terminal, the system having a conduit interconnecting two terminals and blower means for pneumatically transporting a carrier in either direction between the terminals, comprising:
    a cover having an interior and exterior and being horizontally slidable to open and close a terminal;
    a track upon which said cover slides between open and closed positions, said track defining an air gap with the cover through which air under pressure in the terminal can pass;
    guide means for locating the cover on said track for sliding along said track; and
    valve means for sealing said air gap, said valve means extending along the length of said air gap and interior to said cover, and freely movable by the air under pressure flowing through said air gap from a first position wherein air under pressure can freely pass through said air gap to blow debris from said track, to a second position sealing said air gap against the pressurized airflow.

6. A self-cleaning cover and track assembly for a pneumatic carrier system terminal, the system having a conduit interconnecting two terminals and blower means for pneumatically transporting a carrier in either direction between the terminals, comprising:
    a pair of parallel tracks,
    a cover having an interior and exterior, two bottom edges, and a flange portion extending outwardly from each bottom edge and terminating in a flange edge, said bottom edges sliding along said tracks when said cover is moved between open and closed positions,
    rollers spaced along said tracks and engaging a respective flange edge to position said cover on said tracks, said rollers having a radially outwardly extending lip overlying a respective cover flange with said lips spaced from said cover flanges when said terminal is not pressurized, said flanges abutting said lips when said cover is lifted upon the admission of air under pressure to the terminal by the blower means, abutment of said flanges against said lips providing a pair of airpaths between said cover bottom edges and said tracks for outflowing pressurized air, and a valve member mounted adjacent and along the length of each air path and extending into the conduit, each said valve member having a first position wherein air can freely pass through the air path, and a second position wherein said valve seals the air path to the outward passage of air, said valve operated through admission of air under pressure into the conduit with the cover in the closed position, the admitted pressurized air initially flowing through the air path and thereby blowing debris off the track, and then propelling said valve member to said second position, sealing said air path against further outflow of pressurized air.

* * * * *